United States Patent
Li et al.

(10) Patent No.: US 11,499,407 B2
(45) Date of Patent: Nov. 15, 2022

(54) EXPLOITING STRUCTURE FOR NATURAL GAS HYDRATE RESERVOIR AND EXPLOITING METHOD FOR NATURAL GAS HYDRATE BY INJECTING HYDRAULIC CALCIUM OXIDE VIA GAS FRACTURING

(71) Applicant: INSTITUTE OF GEOLOGY AND GEOPHYSICS, CHINESE ACADEMY OF SCIENCES, Beijing (CN)

(72) Inventors: Shouding Li, Beijing (CN); Xiao Li, Beijing (CN); Sijing Wang, Beijing (CN); Yiming Sun, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 62 days.

(21) Appl. No.: 16/943,811

(22) Filed: Jul. 30, 2020

(65) Prior Publication Data
US 2021/0270117 A1 Sep. 2, 2021

(30) Foreign Application Priority Data
Feb. 28, 2020 (CN) .......................... 202010128589.9

(51) Int. Cl.
| | |
|---|---|
| E21B 43/295 | (2006.01) |
| C09K 8/80 | (2006.01) |
| C09K 8/594 | (2006.01) |
| E21B 41/00 | (2006.01) |

(52) U.S. Cl.
CPC ............ *E21B 43/295* (2013.01); *C09K 8/594* (2013.01); *C09K 8/80* (2013.01); *E21B 41/0099* (2020.05); *C09K 2208/22* (2013.01)

(58) Field of Classification Search
CPC ............................ E21B 41/00; E21B 41/0099
See application file for complete search history.

(56) References Cited

U.S. PATENT DOCUMENTS

| | | | |
|---|---|---|---|
| 2015/0090455 A1 | 4/2015 | Balczewski | |
| 2021/0404295 A1* | 12/2021 | Li | E21B 43/02 |

FOREIGN PATENT DOCUMENTS

| | | | | |
|---|---|---|---|---|
| CA | 2818200 A1 * | 6/2012 | ......... | G01N 25/4813 |
| CA | 2818380 A1 * | 6/2014 | ............ | E21B 43/24 |
| CN | 104818962 A | 8/2015 | | |
| CN | 105443988 A | 3/2016 | | |

(Continued)

OTHER PUBLICATIONS

Translation of JP 2003214082 A; 2003.*
(Continued)

*Primary Examiner* — Angela M DiTrani Leff
(74) *Attorney, Agent, or Firm* — Merchant & Gould P.C.

(57) ABSTRACT

A method for exploiting a natural gas hydrate reservoir includes drilling a borehole entering the natural gas hydrate reservoir; perforating the borehole to form perforations; fracturing the natural gas hydrate reservoir via the perforations by using a gas containing calcium oxide powder having a particle size 0.001 to 10 mm to generate a fracture; and collecting natural gas released by the natural gas hydrate. The method is easy to operate, cost-effective, and suitable for commercial applications.

6 Claims, 2 Drawing Sheets

(56) References Cited

FOREIGN PATENT DOCUMENTS

| | | | | |
|---|---|---|---|---|
| CN | 105485521 A | | 4/2016 | |
| CN | 106437653 A | * | 2/2017 | |
| JP | 2001-279281 A | | 10/2001 | |
| JP | 2003214082 A | * | 7/2003 | ........... E21B 43/166 |
| JP | 2012172418 A | * | 9/2012 | |
| JP | 2019214880 A | * | 12/2019 | ............. E21B 17/01 |
| WO | WO-2018008535 A1 | * | 1/2018 | ............. E21B 43/26 |

OTHER PUBLICATIONS

Translation of JP 2019214880 A; 2019.*
Translation of WO 2018/008535 A1; 2018.*
Translation of JP 2012172418 A ; 2012.*
Translation of CN 106437653 A ; 2017.*
Chinese Office Action for CN Application No. 202010128589.9 dated Jan. 21, 2022.(6 pages).
Shouding et al., "A Novel Method for Natural Gas Hydrate Production: De-Pressurization and Backfilling with In-situ Supplemental Heat", Journal of Engineering Geology, 2020, 28(2): 282-293.

* cited by examiner

EXPLOITING STRUCTURE FOR NATURAL GAS HYDRATE RESERVOIR AND EXPLOITING METHOD FOR NATURAL GAS HYDRATE BY INJECTING HYDRAULIC CALCIUM OXIDE VIA GAS FRACTURING

CROSS REFERENCE TO RELATED APPLICATIONS

The present application claims the priority to Chinese Patent Application No. 202010128589.9, titled "EXPLOITING STRUCTURE FOR NATURAL GAS HYDRATE RESERVOIR AND EXPLOITING METHOD FOR NATURAL GAS HYDRATE BY INJECTING HYDRAULIC CALCIUM OXIDE VIA GAS FRACTURING", filed with the China National Intellectual Property Administration on Feb. 28, 2020, which is incorporated herein by reference in its entirety.

FIELD

The present invention relates to the field of natural gas hydrate exploitation, and relates to an exploiting structure for a natural gas hydrate reservoir and an exploiting method for a natural gas hydrate, in particular to an exploiting structure for a natural gas hydrate reservoir and an exploiting method for a natural gas hydrate by injecting hydraulic calcium oxide via gas fracturing.

BACKGROUND

Natural gas hydrate (gas hydrate), being a white solid substance and also known as "combustible ice" or "solid gas" or "steam ice", is an ice-like crystalline substance, has extremely strong combustibility, and is mainly composed of water molecules and hydrocarbon gas molecules (mainly methane). The natural gas hydrate is an ice-like, non-stoichiometric, cage crystalline compound formed by mixing water and a natural gas under medium-high pressure and a low temperature under certain conditions (an appropriate temperature, pressure, gas saturation, water salinity, pH, etc.), on the basis that the oxygen atom in a water molecule has relatively high electronegativity and can attract the hydrogen atom in a water molecule close thereto to form a hydrogen bond under high pressure, thus forming a cage structure. Once the temperature increases or the pressure decreases, a methane gas will escape and the solid hydrate will tend to disintegrate. The natural gas hydrate is widely distributed in continental permafrosts, island slope zones, active and passive continental margin uplifts, polar continental shelves, as well as deep-water environments of oceans and some inland lakes in nature, and can be expressed by $mCH_4 \cdot nH_2O$, in which m represents the number of gas molecules in the hydrate, and n is the hydration index, that is, the number of water molecules in the hydrate. In terms of the physical properties of the natural gas hydrate, its density is close to and slightly lower than that of ice. The components constituting the natural gas such as $CH_4$, $C_2H_6$, $C_3H_8$, $C_4H_{10}$ and other homologues, as well as $CO_2$, $N_2$, $H_2S$, etc., may form one or more natural gas hydrates.

In June to September 2013, a high-purity natural gas hydrate sample had been drilled and obtained for the first time in the eastern sea areas of Pearl River Mouth Basin along the coast of Guangdong in China, and considerable controlled reserves were obtained by drilling. In May 2017, trial production of the natural gas hydrate (combustible ice) in the sea areas has achieved a success for the first time in China. On Nov. 3, 2017, the natural gas hydrate was officially approved as a new mineral by the Chinese State Council. The natural gas hydrate is a new type of energy with huge reserves, and thus the trial production thereof has been conducted in countries such as Russia, the United States, Canada, Japan in addition to China. However, the average daily output of the natural gas obtained by various exploiting methods currently used is far from meeting the demands of commercialized development. Among the exploiting methods for a natural gas hydrate currently used, the highest natural gas production in trial production is achieved by a depressurization method, but for such a method, there are still problems such as a low gas production rate of the reservoir to be exploited, instability of the reservoir structure caused by the decomposition of the natural gas hydrate, and an insufficient contact volume.

Therefore, designing a more effective exploiting method for a natural gas hydrate so as to solve the above-mentioned defects in the exploitation of the natural gas hydrate, to further promote the exploitation process of the natural gas hydrate and to meet the demands of large-scale commercialized development, has become one of the focuses of many prospective researchers in the industry.

SUMMARY

In view of the above, the present invention aims to provide an exploiting structure for a natural gas hydrate reservoir and an exploiting method for a natural gas hydrate, in particular an exploiting structure for a natural gas hydrate reservoir and an exploiting method for a natural gas hydrate by injecting hydraulic calcium oxide via gas fracturing. The exploiting structure and method for the natural gas hydrate reservoir provided in the present invention, which have a specific fractured fracture configuration, are capable of increasing the depressurization area, supplementing the decomposition heat of the natural gas hydrate, improving the stability of the natural gas hydrate reservoir, and increasing the permeability thereof, and thereby can overcome the shortcoming and defect of a low gas production rate for the existing exploitation of the natural gas hydrate by depressurization. Moreover, this method is simple and easy to operate, and has low exploitation costs, and as a result, it is suitable for large-scale commercial promotion and application.

The present invention discloses an exploiting structure for a natural gas hydrate reservoir, comprising:
a drilling well located in the natural gas hydrate reservoir; and
a fractured fracture provided in communication with the drilling well, which is located in the natural gas hydrate reservoir and in which a gas containing calcium oxide powder is provided.

Preferably, the drilling well includes a vertical well and/or a horizontal well;
the fractured fracture has a width of 0.1 to 100 mm and a length of 10 to 300 m;
the number of the fractured fracture is one or more;
the angle between the length direction of the fractured fracture and the length direction of the drilling well is 45° to 140°.

Preferably, the fractured fracture is formed by perforation and high-pressure gas fracturing;
the calcium oxide includes hydraulic lime;
the calcium oxide powder has a particle size of 0.001 to 10 mm;

the gas containing calcium oxide powder has a calcium oxide concentration of 5 to 90 kg/kg and a pressure of 1 to 60 MPa.

Preferably, the gas includes air;

the drilling well has a diameter of 100 to 800 mm;

the gas containing calcium oxide powder is also provided in the drilling well;

after the drilling well is depressurized, in the fractured fracture, the water in the natural gas hydrate reservoir forms calcium hydroxide with the calcium oxide, and the calcium hydroxide forms a hard filler with sediments in the natural gas hydrate reservoir.

The present invention discloses an exploiting method for a natural gas hydrate reservoir, comprising the steps of:

1) laying a drilling platform in a natural gas hydrate occurrence area for drilling construction, to construct a drilling well entering the natural gas hydrate reservoir;

2) perforating the drilling well located in the natural gas hydrate reservoir to form a perforated fracture in the natural gas hydrate reservoir around the drilling well;

3) fracturing the natural gas hydrate reservoir with a gas containing calcium oxide powder through the drilling well, such that the gas containing calcium oxide powder enters the perforated fracture; and 4) depressurizing the drilling well, pumping water and exploiting the natural gas.

Preferably, the exploiting method is a method of depressurization and backfilling with in-situ supplemental heat;

the natural gas hydrate occurrence area includes a natural gas hydrate occurrence area in a sea area;

the drilling platform includes a drilling platform in seawater.

Preferably, the drilling well includes a horizontal well and/or a vertical well, in which the vertical well is specifically drilled by passing a drilling well through the seawater and overlying strata respectively, followed by entering the natural gas hydrate reservoir; and the horizontal well includes a vertical section and a horizontal section, and the horizontal well is specifically drilled by passing a vertical section of a drilling well through the seawater and overlying strata respectively followed by entering the natural gas hydrate reservoir, and then drilling a horizontal section in the natural gas hydrate reservoir.

Preferably, the step 2) is performed after the drilling is completed;

the perforating includes one or more of uniform perforation, spiral-phase perforation and hydraulic jet perforation;

the perforated fracture is specifically in the form of a plurality of perforated fractures uniformly distributed;

the perforated fracture is distributed in the vertical section and/or the horizontal section of the horizontal well.

Preferably, the pressure of the fracturing is 1 to 60 MPa;

the perforating and the fracturing can be multi-stage clustering perforation and staged fracturing;

the depressurizing is specifically by reducing the wellhead pressure of the drilling well after the fracturing is stopped; and the wellhead pressure of the drilling well is greater than or equal to 1 MPa after the depressurizing.

Preferably, the pumping water is pumping water in the natural gas hydrate reservoir and water generated by the decomposition of the natural gas hydrate from the wellbore of the drilling well;

the natural gas generated by the decomposition of the natural gas hydrate migrates from the wellbore of the drilling well to the wellhead thereof for gas production; and the exploiting method further comprises a process of repeating the fracturing step and/or continuing to reduce the wellhead pressure so as to increase and maintain the gas production rate.

The present invention discloses an exploiting structure for a natural gas hydrate reservoir, comprising a drilling well located in a natural gas hydrate reservoir; and a fractured fracture provided in communication with the drilling well, which is located in natural gas hydrate reservoir and in which a gas containing calcium oxide powder is provided.

Compared with the prior art, the present invention is directed to the problems of the existing exploiting methods for a natural gas hydrate reservoir, especially the depressurization method. In the present invention, it has been found that the decomposition of the natural gas hydrate requires the absorption of a large amount of heat, and the existing heat supply of the natural gas hydrate reservoir basically depends on the formation heat transfer or the wellbore heat injection, however, the formation heat transfer has a low rate and the wellbore heat injection has low heat exchange efficiency, resulting in low heat supply efficiency which limits the gas production rate. Moreover, the natural gas hydrate in a sea area is occurred in the pores of the sediments, and the decomposition of the natural gas hydrate results in the decrease in adhesion of the skeleton of the sediments and the increase in effective stress thereof. In such a case, the large-scale exploitation will cause the instability of the reservoir structure, the destruction of the wellbore and even the submarine landslides, and in addition to those, the exploitation with a vertical well has an insufficient contact volume with the reservoir, which results in a small depressurization area of the natural gas hydrate, and thus less decomposition of the natural gas hydrate.

In the present invention, a special exploiting structure for a natural gas hydrate reservoir is inventively designed, in which calcium oxide powder in a high concentration is carried with a gas into a fractured fracture and filled with the fractured fracture, and the natural gas hydrate in the fractured fracture is decomposed after the drilling well is depressurized. The water generated by the decomposition reacts with the calcium oxide to release a large amount of heat which provides the heat required for the decomposition of the natural gas hydrate and increases the decomposition rate, and calcium hydroxide generated from the decomposition is mixed with the sediments to form a calcium hydroxide filler with high porosity, which not only supports the fractured fracture, but also has good permeability, thereby improving the gas production rate of the natural gas.

In addition, the exploiting method for a natural gas hydrate provided in the present invention is capable of increasing the depressurization area, supplementing the decomposition heat of the natural gas hydrate, improving the stability of the natural gas hydrate reservoir, and increasing the permeability thereof, thereby effectively overcoming the shortcoming and defect of a low gas production rate of the traditional exploitation of the natural gas hydrate due to low heat supply efficiency resulted from the facts that the decomposition of the natural gas hydrate during the exploitation of the natural gas hydrate requires the absorption of a large amount of heat, and the existing heat supply of the natural gas hydrate reservoir basically depends on the formation heat transfer or the wellbore heat injection, however, the formation heat transfer has a low rate and the wellbore heat injection has low heat exchange efficiency. Meanwhile, the exploiting structure and method provided in the present invention are also capable of solving problems that the natural gas hydrate in a sea area is occurred in the pores of the sediments, and the decomposition of the natural gas hydrate results in the decrease in adhesion of the skeleton of the sediments and the increase in effective stress thereof, in which case the large-scale exploitation will cause the instability of the reservoir structure, the destruction of the wellbore and even the submarine landslides. The exploiting method for a natural gas hydrate provided in the present invention is simple and easy to operate, and has low exploitation costs, which provides a new idea for large-scale exploitation of the natural gas hydrate, and is suitable for commercial promotion and application.

The results of theoretical analysis and experimental simulation show that the heat generated by the reaction of 0.84 mol of calcium oxide with water can provide the decomposition heat for 1 mol of a pure natural gas hydrate. The natural gas hydrate reservoir in the Shenhu sea area of the South China Sea has a porosity of 33% and a natural gas hydrate saturation of 76%. The reaction heat of 90.11 kg (0.027 $m^3$) of calcium oxide with water CAN provide the decomposition heat for 1 $m^3$ of the natural gas hydrate in the reservoir as well as the decomposition heat for producing 42.81 $m^3$ of a natural gas. The reaction of the calcium oxide with water generates 0.053 $m^3$ of a calcium hydroxide solid filler, which forms a cementitious material together with clay minerals and feldspar quartzs in the natural gas hydrate reservoir, thereby improving the stability of the reservoir after the decomposition of the natural gas hydrate and increasing the permeability thereof (55.7 to 269 mD).

DETAILED DESCRIPTION

Figure 1:
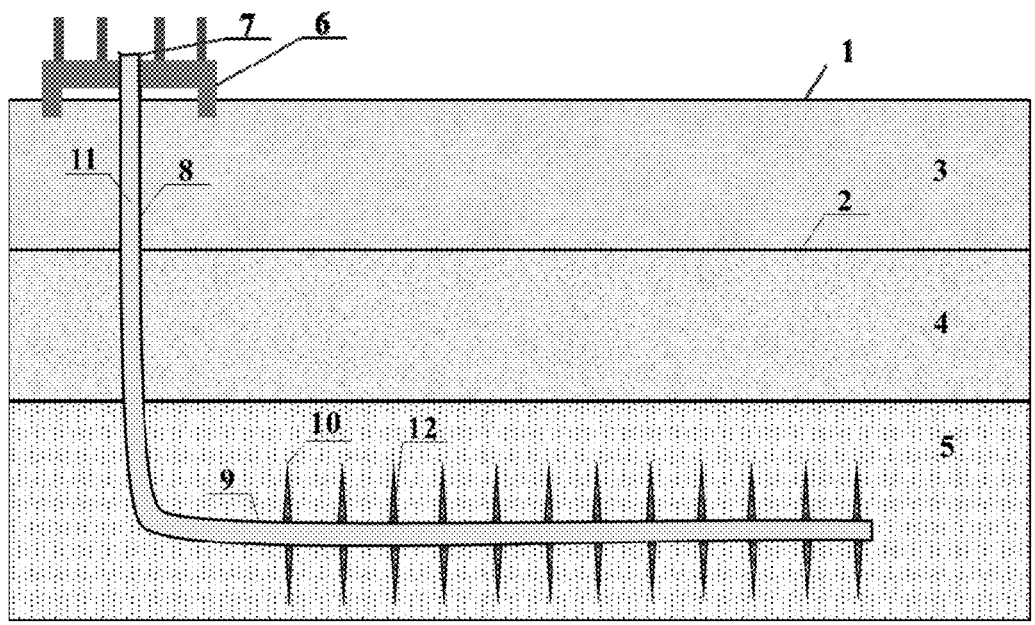
FIG. 1 is a schematic diagram of the exploiting method for a natural gas hydrate by injecting calcium oxide via gas fracturing provided in the present invention.

In order to further understand the present invention, the preferred embodiments of the present invention will be described below in conjunction with examples, but it should be understood that the description is only to further illustrate the features and advantages of the present invention rather than to limit the claims of the present invention.

All the raw materials of the present invention are not particularly limited in their source, as long as they are commercially available or can be prepared according to conventional methods well known to those skilled in the art.

All the raw materials of the present invention are not particularly limited in their purity, and in the present invention, industrial purity or the conventional purity requirements of the exploiting industry is preferably used.

All the raw materials of the present invention, of which the trademarks and abbreviations all belong to the conventional trademarks and abbreviations in the art and each of which is clear and explicit in the field of its related use, are commercially available or can be prepared according to conventional methods by those skilled in the art based on the trademarks, abbreviations and corresponding uses thereof.

All the processes of the present invention, of which the abbreviations all belong to the conventional abbreviations in the art and each of which is clear and explicit in the field of its related use, can be understood in term of their conventional process steps by those skilled in the art based on the abbreviations thereof.

The present invention discloses an exploiting structure for a natural gas hydrate reservoir, comprising:
a drilling well located in the natural gas hydrate reservoir; and
a fractured fracture provided in communication with the drilling well, which is located in the natural gas hydrate reservoir and in which a gas containing calcium oxide powder is provided.

The natural gas hydrate reservoir is not particularly limited in terms of its definition in the present invention, as long as it has the definition of the natural gas hydrate reservoir well-known to those skilled in the art. The natural gas hydrate reservoir may be selected and adjusted by those skilled in the art based on the conditions of the hydrate occurrence area and reservoir, the exploiting requirements and the gas production requirements. The natural gas hydrate reservoir according to the present invention is exemplified by a natural gas hydrate reservoir in a sea area, above which is the overlying strata and seawater sequentially.

The exploiting structure for a natural gas hydrate reservoir of the present invention comprises a drilling well located in the natural gas hydrate reservoir. The specific type of the drilling well is not particularly limited in principle in the present invention, and may be selected and adjusted by those skilled in the art based on the conditions of the hydrate occurrence area and reservoir, the exploiting requirements and the gas production requirements. The drilling well of the present invention preferably includes a vertical well and/or a horizontal well, more preferably is a vertical well or a horizontal well, in order to better increase the depressurization area in exploitation, supplement more heat for the decomposition of the natural gas hydrate, improve the stability of the natural gas hydrate reservoir, and increase the permeability thereof, thereby increasing the gas production rate. In the present invention, an exploitation well drilled in any other angle may also be applied.

The specific parameters of the drilling well are not particularly limited in principle in the present invention, and may be selected and adjusted by those skilled in the art based on the conditions of the hydrate occurrence area and reservoir, the exploiting requirements and the gas production requirements. In the present invention, the diameter of the drilling well is preferably 100 to 800 mm, more preferably 200 to 700 mm, more preferably 300 to 600 mm, and more preferably 400 to 500 mm, in order to better increase the depressurization area in exploitation, supplement more heat for the decomposition of the natural gas hydrate, improve the stability of the natural gas hydrate reservoir, and increase the permeability thereof, thereby increasing the gas production rate.

The exploiting structure for a natural gas hydrate reservoir of the present invention comprises a fractured fracture provided in communication with the drilling well, which is located in the natural gas hydrate reservoir. That is, the fractured fracture is artificially formed in the natural gas hydrate reservoir and is connected with the wellbore of the drilling well.

The specific parameters of the fractured fracture are not particularly limited in principle in the present invention, and may be selected and adjusted by those skilled in the art based on the conditions of the hydrate occurrence area and reservoir, the exploiting requirements and the gas production requirements. In the present invention, the fractured fracture has a width of preferably 0.1 to 100 mm, more preferably 0.5 to 50 mm, more preferably 1 to 10 mm, more preferably 3 to 8 mm, and a length of preferably 10 to 300 m, more preferably 50 to 250 m, more preferably 100 to 200 m, in order to better increase the depressurization area in exploitation, supplement more heat for the decomposition of the natural gas hydrate, improve the stability of the natural gas hydrate reservoir, and increase the permeability thereof, thereby increasing the gas production rate.

The number of the fractured fracture is not particularly limited in principle in the present invention, and may be selected and adjusted by those skilled in the art based on the conditions of the hydrate occurrence area and reservoir, the exploiting requirements and the gas production requirements. In the present invention, the number of the fractured fracture is preferably one or more, and more preferably more than one, in order to better increase the depressurization area in exploitation, supplement more heat for the decomposition of the natural gas hydrate, improve the stability of the natural gas hydrate reservoir, and increase the permeability thereof, thereby increasing the gas production rate.

The direction of the fractured fracture is not particularly limited in principle in the present invention, and may be selected and adjusted by those skilled in the art based on the conditions of the hydrate occurrence area and reservoir, the exploiting requirements and the gas production requirements. In the present invention, the angle between the length direction of the fractured fracture and the length direction of the drilling well is preferably 45° to 140°, more preferably 60° to 120°, and more preferably 75° to 105°, in order to better increase the depressurization area in exploitation, supplement more heat for the decomposition of the natural gas hydrate, improve the stability of the natural gas hydrate reservoir, and increase the permeability thereof, thereby increasing the gas production rate.

The manner for forming the fractured fracture is not particularly limited in principle in the present invention, and may be selected and adjusted by those skilled in the art based on the conditions of the hydrate occurrence area and reservoir, the exploiting requirements and the gas production requirements. In the present invention, the fractured fracture is preferably formed by perforation and high-pressure gas fracturing, in order to better increase the depressurization area in exploitation, supplement more heat for the decomposition of the natural gas hydrate, improve the stability of the natural gas hydrate reservoir, and increase the permeability thereof, thereby increasing the gas production rate.

The exploiting structure for a natural gas hydrate reservoir of the present invention comprises a gas containing calcium oxide powder provided in the fractured fracture.

The selection of the calcium oxide is not particularly limited in principle in the present invention, and it may be selected and adjusted by those skilled in the art based on the conditions of the hydrate occurrence area and reservoir, the exploiting requirements and the gas production requirements. In the present invention, the calcium oxide preferably includes hydraulic lime, in order to better increase the depressurization area in exploitation, supplement more heat for the decomposition of the natural gas hydrate, improve the stability of the natural gas hydrate reservoir, and increase the permeability thereof, thereby increasing the gas production rate. In the present invention, the hydraulic lime, that is, the hydraulic calcium oxide, is a cementitious material containing calcium oxide as the main component and a certain amount of hydraulic minerals, which is obtained from marly calcium oxide containing more than 8% of clay minerals by calcining at 900 to 1250° C. and then milling, and has hydraulicity.

The size of the calcium oxide is not particularly limited in principle in the present invention, and may be selected and adjusted by those skilled in the art based on the conditions of the hydrate occurrence area and reservoir, the exploiting requirements and the gas production requirements. In the present invention, the particle size of the calcium oxide powder is preferably 0.001 to 10 mm, more preferably 0.01 to 9 mm, more preferably 0.125 to 8 mm, and more preferably 2 to 5 mm, in order to better increase the depressurization area in exploitation, supplement more heat for the decomposition of the natural gas hydrate, improve the stability of the natural gas hydrate reservoir, and increase the permeability thereof, thereby increasing the gas production rate.

The parameters of the gas containing calcium oxide powder are not particularly limited in principle in the present invention, and may be selected and adjusted by those skilled in the art based on the conditions of the hydrate occurrence area and reservoir, the exploiting requirements and the gas production requirements. In the present invention, the gas containing calcium oxide powder has a calcium oxide concentration of preferably 5 to 90 kg/kg, more preferably 15 to 80 kg/kg, more preferably 25 to 70 kg/kg, and more preferably 35 to 60 kg/kg, and a pressure of preferably 1 to 60 MPa, more preferably 5 to 55 MPa, more preferably 15 to 45 MPa, and more preferably 25 to 35 MPa, in order to better increase the depressurization area in exploitation, supplement more heat for the decomposition of the natural gas hydrate, improve the stability of the natural gas hydrate reservoir, and increase the permeability thereof, thereby increasing the gas production rate. In the present invention, the gas preferably includes air.

In the present invention, the gas containing calcium oxide powder is preferably also provided in the drilling well, in order to give a complete and detailed technical solution so as to better increase the depressurization area in exploitation, supplement more heat for the decomposition of the natural gas hydrate, improve the stability of the natural gas hydrate reservoir, and increase the permeability thereof, thereby increasing the gas production rate.

After the drilling well is depressurized, in the fractured fracture, the water in the natural gas hydrate reservoir can form calcium hydroxide with the calcium oxide, and the calcium hydroxide can form a hard filler with sediments in the natural gas hydrate reservoir, in order to give a complete and detailed technical solution so as to better increase the depressurization area in exploitation, supplement more heat for the decomposition of the natural gas hydrate, improve the stability of the natural gas hydrate reservoir, and increase the permeability thereof, thereby increasing the gas production rate.

The present invention discloses an exploiting method for a natural gas hydrate reservoir, comprising the steps of:

1) laying a drilling platform in a natural gas hydrate occurrence area for drilling construction, to construct a drilling well entering the natural gas hydrate reservoir;

2) perforating the drilling well located in the natural gas hydrate reservoir to form a perforated fracture in the natural gas hydrate reservoir around the drilling well;

3) fracturing the natural gas hydrate reservoir with a gas containing calcium oxide powder through the drilling well, such that the gas containing calcium oxide powder enters the perforated fracture; and 4) depressurizing the drilling well, pumping water and exploiting the natural gas.

The parameters, morphologies and positional relationships as well as the respective preference principles in the exploiting structure for a natural gas hydrate reservoir in the above-mentioned exploiting method of the present invention are consistent with the corresponding parameters, morphologies and positional relationships as well as the respective preference principles in the exploiting structure for a natural gas hydrate reservoir as described above, and thus the description thereof will be omitted here.

In the present invention, first, a step of laying a drilling platform in a natural gas hydrate occurrence area for drilling construction, to construct a drilling well entering the natural gas hydrate reservoir is performed.

The specific selection of the natural gas hydrate occurrence area is not particularly limited in principle in the present invention, and it may be selected and adjusted by those skilled in the art based on the conditions of the hydrate occurrence area and reservoir, the exploiting requirements and the gas production requirements. In the present invention, the natural gas hydrate occurrence area preferably includes a natural gas hydrate occurrence area in a sea area, in order to better increase the depressurization area in exploitation, supplement more heat for the decomposition of the natural gas hydrate, improve the stability of the natural gas hydrate reservoir, and increase the permeability thereof, thereby increasing the gas production rate.

The specific selection of the drilling platform is not particularly limited in principle in the present invention, and it may be selected and adjusted by those skilled in the art based on the conditions of the hydrate occurrence area and reservoir, the exploiting requirements and the gas production requirements. In the present invention, the drilling platform preferably includes a drilling platform in seawater, in order to better increase the depressurization area in exploitation, supplement more heat for the decomposition of the natural gas hydrate, improve the stability of the natural gas hydrate reservoir, and increase the permeability thereof, thereby increasing the gas production rate.

The specific type of the drilling well is not particularly limited in principle in the present invention, and may be selected and adjusted by those skilled in the art based on the conditions of the hydrate occurrence area and reservoir, the exploiting requirements and the gas production requirements. The drilling well preferably includes a horizontal well and/or a vertical well, more preferably a horizontal well or a vertical well, and more preferably a horizontal well, in order to better increase the depressurization area in exploitation, supplement more heat for the decomposition of the natural gas hydrate, improve the stability of the natural gas hydrate reservoir, and increase the permeability thereof, thereby increasing the gas production rate. Specifically, the horizontal well of the present invention preferably comprises a vertical section and a horizontal section.

Based on the fact that the depressurization area in exploitation of the natural gas hydrate affects the output of the natural gas, it is preferable in the present invention to adopt a uniform perforation technology in a horizontal well, which will greatly increase the depressurization area of the natural gas hydrate reservoir and overcome the shortcoming of a small depressurization area of the existing exploitation by depressurization in a vertical well.

The specific process of the drilling construction is not particularly limited in principle in the present invention, and may be selected and adjusted by those skilled in the art based on the conditions of the hydrate occurrence area and reservoir, the exploiting requirements and the gas production requirements. In the present invention, the drilling construction when the drilling well is a vertical well is preferably carried out by passing a drilling well through the seawater and overlying strata respectively, followed by entering the natural gas hydrate reservoir, and the drilling construction when the drilling well is a horizontal well is preferably carried out by passing a vertical section of a drilling well through the seawater and overlying strata respectively followed by entering the natural gas hydrate reservoir, and then drilling a horizontal section in the natural gas hydrate reservoir, in order to better increase the depressurization area in exploitation, supplement more heat for the decomposition of the natural gas hydrate, improve the stability of the natural gas hydrate reservoir, and increase the permeability thereof, thereby increasing the gas production rate.

Subsequently, a step of perforating the drilling well located in the natural gas hydrate reservoir to form a perforated fracture in the natural gas hydrate reservoir around the drilling well is performed in the present invention. Specifically, this step can be performed after the drilling is completed.

The specific manner of the perforating is not particularly limited in principle in the present invention, and may be selected and adjusted by those skilled in the art based on the conditions of the hydrate occurrence area and reservoir, the exploiting requirements and the gas production requirements. In the present invention, the perforating preferably includes one or more of uniform perforation, spiral-phase perforation and hydraulic jet perforation, more preferably is uniform perforation, spiral-phase perforation or hydraulic jet perforation, and more preferably is uniform perforation, in order to better increase the depressurization area in exploitation, supplement more heat for the decomposition of the natural gas hydrate, improve the stability of the natural gas hydrate reservoir, and increase the permeability thereof, thereby increasing the gas production rate.

The specific form of the perforated fracture is not particularly limited in principle in the present invention, and may be selected and adjusted by those skilled in the art based on the conditions of the hydrate occurrence area and reservoir, the exploiting requirements and the gas production requirements. In the present invention, the perforated fracture is preferably in a form of a plurality of perforated fractures, more preferably in a form of a plurality of perforated fractures uniformly distributed, in order to better increase the depressurization area in exploitation, supplement more heat for the decomposition of the natural gas hydrate, improve the stability of the natural gas hydrate reservoir, and increase the permeability thereof, thereby increasing the gas production rate.

The specific position of the perforated fracture is not particularly limited in principle in the present invention, and may be selected and adjusted by those skilled in the art based on the conditions of the hydrate occurrence area and reservoir, the exploiting requirements and the gas production requirements. In the present invention, the perforated fracture is preferably distributed in the vertical section and/or the horizontal section of the horizontal well, more preferably in the horizontal section of the horizontal well, in order to better increase the depressurization area in exploitation, supplement more heat for the decomposition of the natural gas hydrate, improve the stability of the natural gas hydrate reservoir, and increase the permeability thereof, thereby increasing the gas production rate.

Next, a step of fracturing the natural gas hydrate reservoir with a gas containing calcium oxide powder through the drilling well, such that the gas containing calcium oxide powder enters the perforated fracture, is performed in the present invention.

The specific parameters of the fracturing are not particularly limited in principle in the present invention, and may be selected and adjusted by those skilled in the art based on the conditions of the hydrate occurrence area and reservoir, the exploiting requirements and the gas production requirements. In the present invention, the pressure of the fracturing is preferably 1 to 60 MPa, more preferably 5 to 55 MPa, more preferably 15 to 45 MPa, and more preferably 25 to 35 MPa, in order to better increase the depressurization area in exploitation, supplement more heat for the decomposition of the natural gas hydrate, improve the stability of the natural gas hydrate reservoir, and increase the permeability thereof, thereby increasing the gas production rate. In the present invention, the gas preferably includes air.

The implementation of the perforating and the fracturing is not particularly limited in principle in the present invention, and may be selected and adjusted by those skilled in the art based on the conditions of the hydrate occurrence area and reservoir, the exploiting requirements and the gas production requirements. In the present invention, the perforating and the fracturing preferably are multi-stage clustering perforation and staged fracturing, more preferably multi-stage clustering perforation or staged fracturing, in order to better increase the depressurization area in exploitation, supplement more heat for the decomposition of the natural gas hydrate, improve the stability of the natural gas hydrate reservoir, and increase the permeability thereof, thereby increasing the gas production rate.

The process and parameters of the depressurizing are not particularly limited in principle in the present invention, and may be selected and adjusted by those skilled in the art based on the conditions of the hydrate occurrence area and reservoir, the exploiting requirements and the gas production requirements. In the present invention, the depressurizing is preferably by reducing the wellhead pressure of the drilling well after the fracturing is stopped, and the wellhead pressure of the drilling well is preferably greater than or equal to 1 MPa after the depressurizing, more preferably greater than or equal to 2 MPa, and more preferably greater than or equal to 3 MPa, in order to better increase the depressurization area in exploitation, supplement more heat for the decomposition of the natural gas hydrate, improve the stability of the natural gas hydrate reservoir, and increase the permeability thereof, thereby increasing the gas production rate.

Finally, a step of depressurizing the drilling well, pumping water and exploiting the natural gas is performed.

The specific process of the pumping water is not particularly limited in principle in the present invention, and may be selected and adjusted by those skilled in the art based on the conditions of the hydrate occurrence area and reservoir, the exploiting requirements and the gas production requirements. In the present invention, the pumping water is preferably pumping water generated by the decomposition of the natural gas hydrate from the wellbore of the drilling well, and more preferably pumping water in the natural gas hydrate reservoir and water generated by the decomposition of the natural gas hydrate from the wellbore of the drilling well, in order to better increase the depressurization area in exploitation, supplement more heat for the decomposition of the natural gas hydrate, improve the stability of the natural gas hydrate reservoir, and increase the permeability thereof, thereby increasing the gas production rate.

The specific process of the exploiting the natural gas is not particularly limited in principle in the present invention, and may be selected and adjusted by those skilled in the art based on the conditions of the hydrate occurrence area and reservoir, the exploiting requirements and the gas production requirements. In the present invention, the natural gas generated by the decomposition of the natural gas hydrate preferably migrates from the wellbore of the drilling well to the wellhead thereof for gas production, in order to give a complete and detailed technical solution so as to better increase the depressurization area in exploitation, supplement more heat for the decomposition of the natural gas hydrate, improve the stability of the natural gas hydrate reservoir, and increase the permeability thereof, thereby increasing the gas production rate.

In the present invention, the exploiting method preferably further comprises a process of repeating the fracturing step and/or continuing to reduce the wellhead pressure so as to increase and maintain the gas production rate, in order to give a complete and detailed technical solution so as to better increase the depressurization area in exploitation, supplement more heat for the decomposition of the natural gas hydrate, improve the stability of the natural gas hydrate reservoir, and increase the permeability thereof, thereby increasing the gas production rate.

The above steps provide a method of depressurization and backfilling with in-situ supplemental heat for exploiting the natural gas hydrate reservoir, which is capable of overcoming the shortcoming and defect of a low gas production rate in the existing exploitation of the natural gas hydrate by depressurization, thereby increasing the depressurization area, supplementing heat for the decomposition of the natural gas hydrate, improving the stability of the natural gas hydrate reservoir, and increasing the permeability thereof. In order to give a complete and detailed technical solution so as to better increase the depressurization area in exploitation, supplement more heat for the decomposition of the natural gas hydrate, improve the stability of the natural gas hydrate reservoir, and increase the permeability thereof, thereby increasing the gas production rate, the exploiting method for a natural gas hydrate reservoir of the present invention can be specifically carried out as follows.

The exploiting method for a natural gas hydrate by injecting hydraulic calcium oxide via gas fracturing provided in the present invention is mainly carried out by fracturing with a high-pressure gas containing high-concentration hydraulic calcium oxide powder using a uniform perforation technology in a horizontal well, depressurizing the wellhead and exploiting, and repeating the perforation and fracturing. The main technical solution of the method is composed of the following four parts.

The uniform perforation technology in a horizontal well is carried out by laying an offshore drilling platform 6 in a natural gas hydrate occurrence area in a sea area, to construct a drilling well 7 which has a vertical section 8 passing through the seawater 3 and the overlying strata 4 respectively, and a horizontal section 9 drilled in the natural gas hydrate reservoir 5; and perforating in the horizontal section 9 to form perforated fractures 10 uniformly distributed in the natural gas hydrate reservoir 5 after the drilling well 7 is completed.

Fracturing with a high-pressure gas containing high-concentration hydraulic calcium oxide powder is carried out by mixing the hydraulic calcium oxide powder with the high-pressure gas to form the high-pressure gas containing the high-concentration hydraulic calcium oxide powder 11, and fracturing the natural gas hydrate reservoir 5 such that the high-pressure gas containing the high-concentration hydraulic calcium oxide powder 11 is extended into the perforated fractures 10, which carries the hydraulic calcium oxide powder into the fractured fracture in which staged perforation and fracturing are performed in the horizontal section 9 of the drilling well.

Depressurizing the wellhead and exploiting is carried out by reducing the wellhead pressure of the drilling well 7 and pumping water from the wellbore of the drilling well 7 after the fracturing is stopped, so as to reduce the pressure in the fractured fractures in the natural gas hydrate reservoir 5. In such a manner, the natural gas hydrate is decomposed into a natural gas and water, in which the natural gas migrates from the wellbore to the wellhead of the drilling well 7, the water reacts with the hydraulic calcium oxide in the fractures to form calcium hydroxide and release a large number of heat, thereby promoting the rapid decomposition of the natural gas hydrate, and further, the calcium hydroxide generated from this reaction is mixed with the sediments to form a high-porosity calcium hydroxide filler which not only supports the stabilization of the fractures, but also has good permeability, and thus is favorable for pumping water in the wellbore and gas production.

Repeating the perforation and fracturing is carried out by repeating a process of fracturing with the high-pressure gas containing high-concentration hydraulic calcium oxide powder, and applying an exploiting process by depressurizing the wellhead so as to maintain a high gas production rate, when the gas production rate at the wellhead of the drilling well 7 decreases.

Referring to FIG. 1, FIG. 1 is a schematic diagram of the exploiting method for a natural gas hydrate by injecting calcium oxide via gas fracturing provided in the present invention, in which 1: sea level; 2: seabed; 3: seawater; 4: overlying strata; 5: natural gas hydrate reservoir; 6: offshore drilling platform; 7: drilling well; 8: vertical section of drilling well; 9: horizontal section of drilling well; 10: perforated fracture; 11: high-pressure gas containing high-concentration hydraulic calcium oxide powder; 12: calcium hydroxide backfilling.

Figure 2:
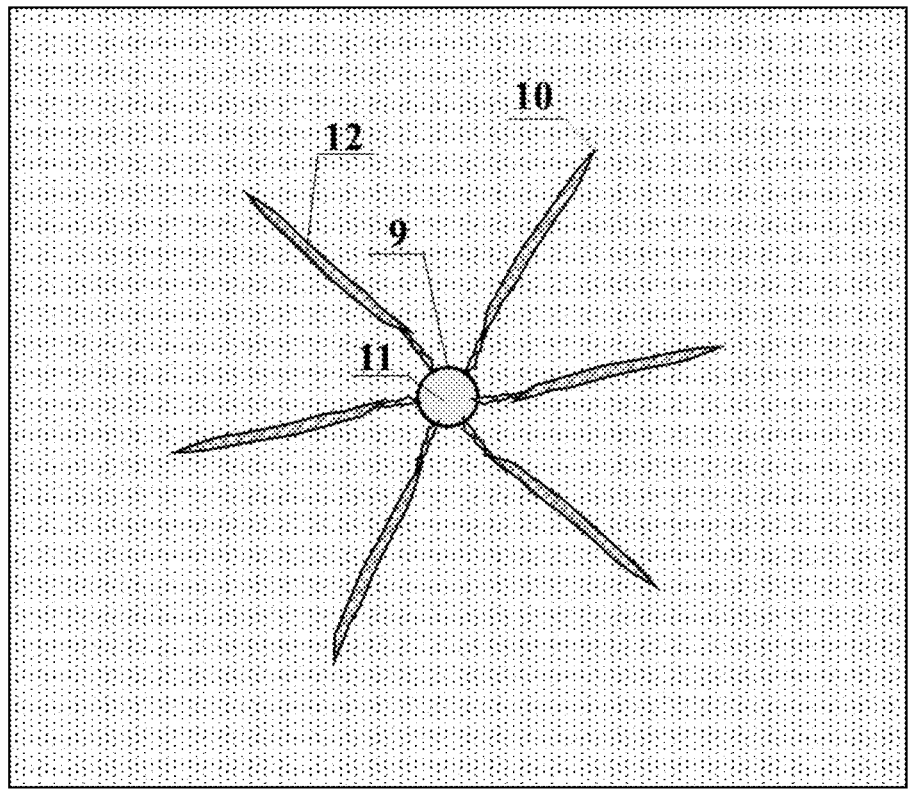
FIG. 2 is a cross-sectional schematic diagram of the horizontal section of the horizontal drilling well provided in the present invention.

Referring to FIG. 2, FIG. 2 is a cross-sectional schematic diagram of the horizontal section of the horizontal drilling well provided in the present invention.

In the present invention, several practical factors as follows have been comprehensively analyzed. The decomposition of the natural gas hydrate requires the absorption of a large amount of heat, and the existing heat supply of the natural gas hydrate reservoir basically depends on the formation heat transfer or the wellbore heat injection, however, the formation heat transfer has a low rate and the wellbore heat injection has low heat exchange efficiency, resulting in low heat supply efficiency which limits the gas production rate. In addition, the natural gas hydrate in a sea area is occurred in the pores of the sediments, and the decomposition of the natural gas hydrate results in the decrease in adhesion of the skeleton of the sediments and the increase in effective stress thereof, in which case the large-scale exploitation will cause the instability of the reservoir structure, the destruction of the wellbore and even the submarine landslides. In the present invention, by fracturing with the high-pressure gas containing high-concentration hydraulic calcium oxide powder, the problems such as low heat supply efficiency of the natural gas hydrate and instability of the reservoir structure caused by exploiting can be solved. In this regard, the calcium oxide is introduced into the formation, where the calcium oxide reacts with water to form calcium hydroxide, which releases heat. For this reaction, the following thermochemical equation is referenced.

$$CaO(s) + H_2O(l) = Ca(OH)_2(s)$$

$$\Delta_r H_m^\ominus = -65.2 \text{ kJ/mol}$$

The heat consumed by the decomposition of the hydrate in the formation can be effectively supplemented by the heat released from this reaction. The high-concentration calcium oxide powder is carried into the fractured fracture. After the depressurization, the natural gas hydrate in the fractured fracture is decomposed, and the water generated by the decomposition reacts with calcium oxide to release a large amount of heat, thereby providing the heat required for the decomposition of the natural gas hydrate and increasing the decomposition rate. Further, calcium hydroxide generated by the reaction of the hydraulic calcium oxide is mixed with the sediments to form a high-porosity calcium hydroxide filler, which not only supports the fractured fracture, but also has good permeability, thereby improving the gas production rate of the natural gas.

According to the exploiting structure for a natural gas hydrate reservoir and the exploiting method for a natural gas hydrate by injecting hydraulic calcium oxide via gas fracturing provided in the invention, a special exploiting structure for a natural gas hydrate reservoir is inventively designed, in which calcium oxide powder in a high concentration is carried with a gas into a fractured fracture and filled with the fractured fracture, and the natural gas hydrate in the fractured fracture is decomposed after the drilling well is depressurized. The water generated by the decomposition reacts with the calcium oxide to release a large amount of heat which provides the heat required for the decomposition of the natural gas hydrate and increases the decomposition rate, and calcium hydroxide generated to from the decomposition is mixed with the sediments to form a calcium hydroxide filler with high porosity, which not only supports the fractured fracture, but also has good permeability, thereby improving the gas production rate of the natural gas.

In addition, the exploiting method for a natural gas hydrate provided in the present invention is capable of increasing the depressurization area, supplementing the decomposition heat of the natural gas hydrate, improving the stability of the natural gas hydrate reservoir, and increasing the permeability thereof, thereby effectively overcoming the shortcoming and defect of a low gas production rate of the traditional exploitation of the natural gas hydrate due to low heat supply efficiency resulted from the facts that the decomposition of the natural gas hydrate during the exploitation of the natural gas hydrate requires the absorption of a large amount of heat, and the existing heat supply of the natural gas hydrate reservoir basically depends on the formation heat transfer or the wellbore heat injection, however, the formation heat transfer has a low rate and the wellbore heat injection has low heat exchange efficiency. Meanwhile, the exploiting structure and method provided in the present invention are also capable of solving problems that the natural gas hydrate in a sea area is occurred in the pores of the sediments, and the decomposition of the natural gas hydrate results in the decrease in adhesion of the skeleton of the sediments and the increase in effective stress thereof, in which case the large-scale exploitation will cause the instability of the reservoir structure, the destruction of the wellbore and even the submarine landslides. The exploiting method for a natural gas hydrate provided in the present invention is simple and easy to operate, and has low exploitation costs, which provides a new idea for large-scale exploitation of the natural gas hydrate, and is suitable for commercial promotion and application.

The results of theoretical analysis and experimental simulation show that the heat generated by the reaction of 0.84 mol of calcium oxide with water can provide the decomposition heat for 1 mol of a pure natural gas hydrate. The natural gas hydrate reservoir in the Shenhu sea area of the South China Sea has a porosity of 33% and a natural gas hydrate saturation of 76%. The reaction heat of 90.11 kg (0.027 $m^3$) of calcium oxide with water CAN provide the decomposition heat for 1 $m^3$ of the natural gas hydrate in the reservoir as well as the decomposition heat for producing 42.81 $m^3$ of a natural gas. The reaction of the calcium oxide with water generates 0.053 $m^3$ of a calcium hydroxide solid filler, which forms a cementitious material together with clay minerals and feldspar quartzs in the natural gas hydrate reservoir, thereby improving the stability of the reservoir after the decomposition of the natural gas hydrate and increasing the permeability thereof (55.7 to 269 mD).

In order to further illustrate the present invention, the exploiting structure for a natural gas hydrate reservoir and the exploiting method for a natural gas hydrate provided in the present invention is described in detail below in conjunction with an example, but it should be understood that, the example is embodied based on the premise of the technical solution of the present invention, which gives detailed implementations and specific operating procedures, and is only to further illustrate the features and advantages of the present invention, rather than to limit the claims of the present invention, that is, the scope of protection of the present invention is not limited by the following example.

Example 1

Figure 3:
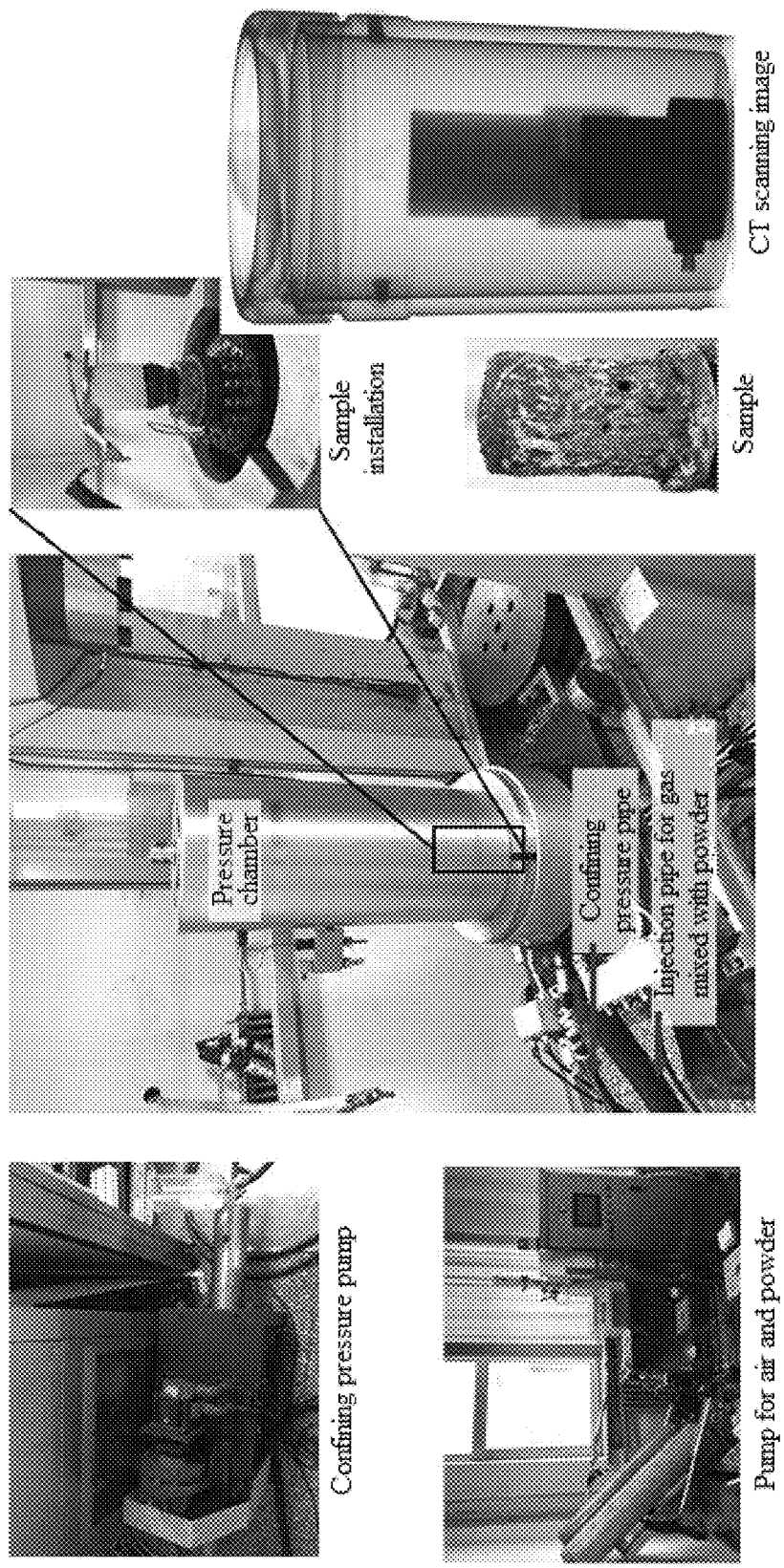
FIG. 3 shows physical views of a simulation test for a simulated natural gas hydrate reservoir and a corresponding exploiting structure provided in the present invention.

Referring to FIG. 3, FIG. 3 shows physical views of a simulation test for a simulated natural gas hydrate reservoir and a corresponding exploiting structure provided in the present invention.

A sediment for simulation was filled in the experimental equipment shown in FIG. 3 to synthesize a natural gas hydrate in situ in the sediment under a high pressure condition of 10 to 15 MPa by means of water saturation. To simulate the natural gas hydrate reservoir in the Shenhu sea area in the South China Sea, the porosity in the synthesized natural gas hydrate reservoir in the experimental equipment was set to 40% to 60%, and the saturation of the natural gas hydrate was set to 40% to 70%.

The simulation test mainly comprised processes of sample synthesis, simulated exploiting, etc. The sample synthesis was carried out by a water saturation process. That is, a methane gas was introduced into a mixture of the solid sediment and water, and then subjected to operations of increasing pressure and reducing temperature, etc., to form a hydrate in the pores of the sediment. This process simulated the formation process of a hydrate reservoir under natural conditions.

The simulated exploiting was carried out by means of the traditional depressurization method and the exploiting method of the present invention, respectively, and a comparative test was conducted. The test process of the traditional depressurization method is not described, while only the simulated exploiting method of the present invention is described here.

When the exploiting method provided in the present invention was simulated and implemented, pipe laying, fracturing, and calcium oxide injection were carried out respectively in the sample based on the aforementioned embodiment to simulate the wellbore, the fractured fracture, and the calcium oxide powder in the reservoir. Pipe laying or drilling was carried out in the sample to simulate the wellbore in actual exploiting, thereby providing a channel for the produced fluid. In the simulation test, gas fracturing was carried out to simulate the reservoir fracturing process in the embodiment, such that at the same time of fracturing, the calcium oxide powder was fed into the fractured fracture by the fracturing gas. After the above steps, the pressure at the exploiting end was reduced to simulate the actual depressurization process and change the system pressure inside the sample, such that the hydrate in the sediment was subjected to phase transformation and decomposition. The produced methane gas was obtained at the exploiting end and the flow rate thereof was monitored, to simulate the exploiting process of the hydrate.

The feasibility and effectiveness of the exploiting method of the present invention could be verified by comparing the exploiting method by simple depressurization with the exploiting method by injecting calcium oxide provided in the present invention by monitoring the gas production and investigating the change in reservoir permeability and the change in reservoir stability.

The mass of the synthesized natural gas hydrate was calculated from the mass of the gas introduced in the sediment, and the gas production rate was measured for the simple depressurization method and the method of depressurization following calcium oxide powder injection, respectively. Due to the exothermic reaction of calcium oxide with water, the calcium oxide injection significantly increased the efficiency of gas production by the decomposition of the hydrate. The measured data of the test showed that the gas production rate of the exploiting method by injecting calcium oxide was increased by 12.3 times with respect to the simple depressurization method, which indicated that the reservoir exploiting structure and the exploiting method designed in the present invention had a significant effect in increasing the gas production rate.

In the hydrate exploiting process, in addition to paying attention to the initial gas production rate, it is also necessary to observe the change in physical properties of the reservoir with the exploiting process. The most important factors are the change in reservoir permeability and the change in reservoir stability, which determine the long-term effectiveness and safety of the exploiting method.

In the simulation test, the sample obtained by the method of depressurization following calcium oxide powder injection was subjected to X-ray CT scanning, and the reservoir permeability was calculated from the pore diameter, which was increased by 47 times. This was mainly due to the fracture generated by fracturing and the backfilling and supporting effect of calcium hydroxide on the reservoir. Therefore, the stable presence of migration channels for the highly permeable fluid was ensured, which was essential for the long-term and efficient exploitation of the hydrate.

In terms of the reservoir stability, during the hydrate exploiting process, the reservoir is gradually deteriorated in mechanical properties due to the disappeared adhesion of the hydrate, and in addition, the solid particles are migrated due to the erosion of the fluid. These processes lead to formation compression and even more serious formation instability events, which is a problem that has to be solved for the safe exploitation of the hydrate. In the exploiting method provided in the present invention, the reaction of calcium oxide with water provides the heat for the decomposition of the hydrate, and the calcium hydroxide generated by this reaction plays a role of backfilling the formation. In the exploiting process of the hydrate, sand producing from the formation may affect the gas exploitation, and meanwhile is also likely to cause formation instability. Therefore, the appropriate supplementation of solid components can effectively reduce the risk of formation instability. In the simulation test, it was found that, by injecting calcium oxide, the integrity of the sample was maintained well even in the later stage of exploiting, and the disintegration and destruction of the sample were significantly reduced, which was essential for the safe exploitation of the hydrate.

In this example, an indoor process of simulating and implementing the exploiting method provided in the present invention was described, and the operation of each step and examples of various parameters were also described. Meanwhile, the feasibility and effectiveness of the new method were verified in terms of the gas production rate, reservoir permeability, and reservoir stability.

The exploiting structure for a natural gas hydrate reservoir and the exploiting method for exploiting a natural gas hydrate by injecting hydraulic calcium oxide via gas fracturing provided in the present invention have been described in detail above, and the principle and implementation of the present invention have been explained using a specific example herein. The description of the above example is only to help understand the method of the present invention and its core idea (including the best mode), and also enables any person skilled in the art to practice the present invention (including manufacturing and use of any device or system) and to implement any combined method. It should be noted that, for those of ordinary skill in the art, without departing from the principle of the present invention, several improvements and modifications can be made to the present invention, which also fall within the scope of the claims of the present invention. The scope of protection of the present invention is defined by the claims, and will include other embodiments conceivable for those skilled in the art. If these other embodiments have structural elements that are not different from what is expressed by the words in the claims, or if they include equivalent structural elements that are not substantially different from what is expressed by the words in the claims, these other embodiments should also be included in the scope of the claims.

The invention claimed is:

1. A method for exploiting a natural gas hydrate reservoir, comprising:
    step 1) laying a drilling platform in a natural gas hydrate occurrence area, and drilling a borehole entering the natural gas hydrate reservoir;
    step 2) perforating the borehole located in the natural gas hydrate reservoir to form perforations in the natural gas hydrate reservoir around the borehole;
    step 3) fracturing the natural gas hydrate reservoir via the perforation by using a gas containing calcium oxide powder, to generate fractures and bring the calcium oxide powder into the perforations and the fractures; and
    step 4) depressurizing the borehole, pumping water out of the borehole to stimulate decomposition of natural gas hydrate, and collecting natural gas released by the natural gas hydrate;
    wherein the calcium oxide is hydraulic lime;
    the calcium oxide powder has a particle size of 0.001 to 10 mm; and
    the gas containing calcium oxide powder has a calcium oxide concentration of 5 to 90 kg/m$^3$ and a pressure of 1 to 60 MPa.

2. The method according to claim 1, wherein the method is a method of depressurization and backfilling with in-situ supplemental heat;
    the natural gas hydrate occurrence area includes a natural gas hydrate occurrence area in a sea area; and
    the drilling platform includes a drilling platform on seawater.

3. The exploiting method according to claim 2, wherein the borehole includes:
    a vertical well, which is drilled by passing a borehole through the seawater and overlying strata, followed by entering the natural gas hydrate reservoir; and/or
    a horizontal well, which includes a vertical section and a horizontal section, and is drilled by passing a vertical section of a borehole through the seawater and overlying strata followed by entering the natural gas hydrate reservoir, and then drilling a horizontal section in the natural gas hydrate reservoir.

4. The method according to claim 3, wherein the step 2) is performed after the drilling is completed;
    the perforating includes one or more of uniform perforation, spiral-phase perforation and hydraulic jet perforation;
    the perforation is in a form of a plurality of perforations uniformly distributed; and
    the perforation is distributed in the vertical section and/or the horizontal section of the horizontal well.

5. The method according to claim 1, wherein the fractures have a width of 0.1 to 100 mm and a length of 10 to 300 m; and
    the angle between the lengthwise direction of the fracture and the lengthwise direction of the borehole is 45° to 140°.

6. The method according to claim 1, wherein the borehole has a diameter of 100 to 800 mm.

* * * * *